United States Patent Office.

THEODORE ENSZLIN, OF NEWBURG, NEW YORK.

Letters Patent No. 75,742, dated March 24, 1868.

IMPROVED SALVE.

*The Schedule referred to in these Letters Patent and making part of the same.*

TO ALL WHOM IT MAY CONCERN:

Be it known that I, THEODORE ENSZLIN, of Newburg, in the county of Orange, in the State of New York, have invented a new and useful Composition of Matter or Salve for the cure of sores; and I do hereby declare that the following is a full and exact description thereof, and of the manner and process of making, compounding, and using the same, in such full and exact terms as to enable others skilled in the art to make and use my invention.

I place four ounces of butter in a stone jar or pot fit to cook in, and cook the same on a stove for about twenty minutes. I skim this well while it is cooking (for the scum and bottom are of no use) until it is quite clear. I then take the clear, put it in another stone jar, and recook it, together with half an ounce of *Malva rotundifolia*, which I put in in small quantities at a time. This second cooking continues fifteen minutes, during which time I stir it well to prevent it from burning. I then take the vegetable, squeeze it well, and place the clear coming from it, and which is the salve, in a well closed-up jar, ready for use.

In using my invention, I apply it twice a day to the sore until a cure is effected.

What I claim as my invention, is—

The new combination of the materials contained in the composition of matter herein described.

THEODORE ENSZLIN.

Witnesses:
MICHAEL H. HIRSCHBERG,
W. T. SHAW.